US011400890B2

(12) United States Patent
Nayak et al.

(10) Patent No.: US 11,400,890 B2
(45) Date of Patent: Aug. 2, 2022

(54) SYSTEMS AND METHODS FOR ALERTING USERS OF OBJECTS APPROACHING VEHICLES

(71) Applicant: Toyota Motor North America, Inc., Plano, TX (US)

(72) Inventors: Apeksha Nayak, Plano, TX (US); Isaac Broyles, Rowlett, TX (US); Tiffany Carter, McKinney, TX (US); Magnus Lassi, Denton, TX (US); Oscar Paramo, Mesquite, TX (US); James Graham, Flower Mound, TX (US); Jackson Brown, Denton, TX (US); Karthikeyan Vellaichamy, Irving, TX (US)

(73) Assignee: Toyota Motor North America, Inc., Plano, TX (US)

( * ) Notice: Subject to any disclaimer, the term of this patent is extended or adjusted under 35 U.S.C. 154(b) by 0 days.

(21) Appl. No.: 17/114,867

(22) Filed: Dec. 8, 2020

(65) Prior Publication Data

US 2022/0176911 A1 Jun. 9, 2022

(51) Int. Cl.
*B60R 25/31* (2013.01)
*B60R 25/10* (2013.01)
*G07C 9/00* (2020.01)

(52) U.S. Cl.
CPC .......... *B60R 25/31* (2013.01); *B60R 25/1012* (2013.01); *G07C 9/00309* (2013.01); *B60R 2025/1013* (2013.01); *G07C 2009/00317* (2013.01); *G07C 2009/00984* (2013.01)

(58) Field of Classification Search
CPC ................ B60R 25/31; B60R 25/1012; B60R 2025/1013; G07C 9/00309; G07C 2009/00317; G07C 2009/00984
See application file for complete search history.

(56) References Cited

U.S. PATENT DOCUMENTS

| | | | |
|---|---|---|---|
| 10,086,833 B1 | 10/2018 | Duan et al. | |
| 10,351,054 B2* | 7/2019 | Rodriguez Barros | G03B 21/00 |
| 10,640,035 B2 | 5/2020 | Morimura | |
| 10,706,293 B1 | 7/2020 | Lei et al. | |
| 2008/0195273 A1* | 8/2008 | Matsuura | B60R 25/1004 |
| | | | 701/29.2 |

(Continued)

FOREIGN PATENT DOCUMENTS

| | | |
|---|---|---|
| EP | 1407106 B1 | 5/2016 |
| KR | 20190064116 A | 6/2019 |

OTHER PUBLICATIONS

International Search Report and Written Opinion with notification transmittal dated Mar. 16, 2022 in related International Application No. PCT/US2021/060351.

*Primary Examiner* — Thomas D Alunkal
(74) *Attorney, Agent, or Firm* — Dinsmore & Shohl LLP

(57) ABSTRACT

A system, the system including one or more sensors arranged to detect an area in a proximity of a vehicle and a controller communicatively coupled to the one or more sensors. The controller is configured to determine that an ignition switch of the vehicle is turned off, determine that a user within the proximity of the vehicle based on data from the one or more sensors, determine that an object is approaching the vehicle based on the data, and alert the user of the object.

20 Claims, 5 Drawing Sheets

(56) References Cited

U.S. PATENT DOCUMENTS

| | | | |
|---|---|---|---|
| 2010/0010723 A1* | 1/2010 | Taki | B60W 30/08 |
| | | | 701/102 |
| 2011/0071735 A1* | 3/2011 | Witek | E05F 15/41 |
| | | | 701/49 |
| 2014/0309805 A1 | 10/2014 | Ricci et al. | |
| 2015/0035662 A1* | 2/2015 | Bowers | G08G 1/165 |
| | | | 340/436 |
| 2017/0144597 A1* | 5/2017 | Wu | B60R 21/0134 |
| 2017/0162047 A1* | 6/2017 | Garcia Lopez | G08G 1/16 |
| 2019/0111835 A1* | 4/2019 | Remberg Bueno | B60Q 1/48 |
| 2019/0279447 A1* | 9/2019 | Ricci | G08G 1/0968 |

* cited by examiner

SYSTEMS AND METHODS FOR ALERTING USERS OF OBJECTS APPROACHING VEHICLES

FIELD

The present specification generally relates to systems and methods for alerting users of objects approaching a vehicle when a vehicle ignition is switched off and the user is in close proximity to the vehicle.

TECHNICAL BACKGROUND

Users are often unaware of their surroundings when exiting a vehicle. For instance, when exiting a vehicle, users may turn their backs to the environment surrounding the vehicle to collect groceries, personal belongings, a child, or the like from the vehicle. During such circumstances, users may be unaware of one or more objects, such as persons, vehicles, animals, and the like approaching the vehicle and possibly threatening the well-being of the users. Passive systems exist to constantly monitor the environment surrounding a vehicle. However, such systems may require undesirably large quantities of power to operate and thus may generally only be available in electric vehicles having large batteries capable of supporting such large quantities of power. In addition, such systems are not configured to alert users of approaching and possibly threatening objects while the user is still in close proximity to the vehicle.

SUMMARY

In one embodiment, a system including one or more sensors arranged to detect an area in a proximity of a vehicle and a controller communicatively coupled to the one or more sensors. The controller is configured to determine that an ignition switch of the vehicle is turned off, determine that a user is within the proximity of the vehicle based on data from the one or more sensors, determine that an object is approaching the vehicle based on the data, and alert the user of the object.

In another embodiment a vehicle, the vehicle including a system. The system includes one or more sensors arranged to detect an area in a proximity of the vehicle and a controller communicatively coupled to the one or more sensors. The controller is configured to determine that an ignition switch of the vehicle is turned off, determine that a user is located within the proximity of the vehicle based on data from the one or more sensors, determine that an object is approaching the vehicle based on the data, and alert the user that the object is approaching the vehicle.

In yet another embodiment a method, the method including receiving, by a controller in a vehicle, sensor data from one or more sensors communicatively coupled to the controller, that sensor data received when an ignition switch of the vehicle is turned off. The method further includes determining that a user is within a proximity of the vehicle from the sensor data, determining that an object is approaching the vehicle based on the sensor data, and alerting the user that the object is approaching the vehicle.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present disclosure generally relates to systems and methods for alerting users of objects approaching a vehicle when the vehicle ignition is switched off and the user is in close proximity to the vehicle. The system may initiate a watch mode when the system determines that the ignition switch of the vehicle is turned off and the system receives (or has received) instructions from the user to initiate a watch mode. Once the watch mode is initiated, the system may monitor the environment surrounding the vehicle to determine the location of the user in relation to the vehicle and the location of one or more objects in relation to the vehicle. The system is further configured to determine if the one or more objects are approaching the vehicle. If the system determines that the user is within a threshold proximity of the vehicle and that the one or more objects are within a second proximity of the vehicle and approaching the vehicle, the system may initiate one or more responsive actions. The one or more responsive actions may include, for example, alerts or alarms to notify the user or third parties of the one or more objects within the second proximity of the vehicle and approaching the vehicle. When the system determines that the user is outside the threshold proximity of the vehicle, the system may automatically shut down.

Figure 1:
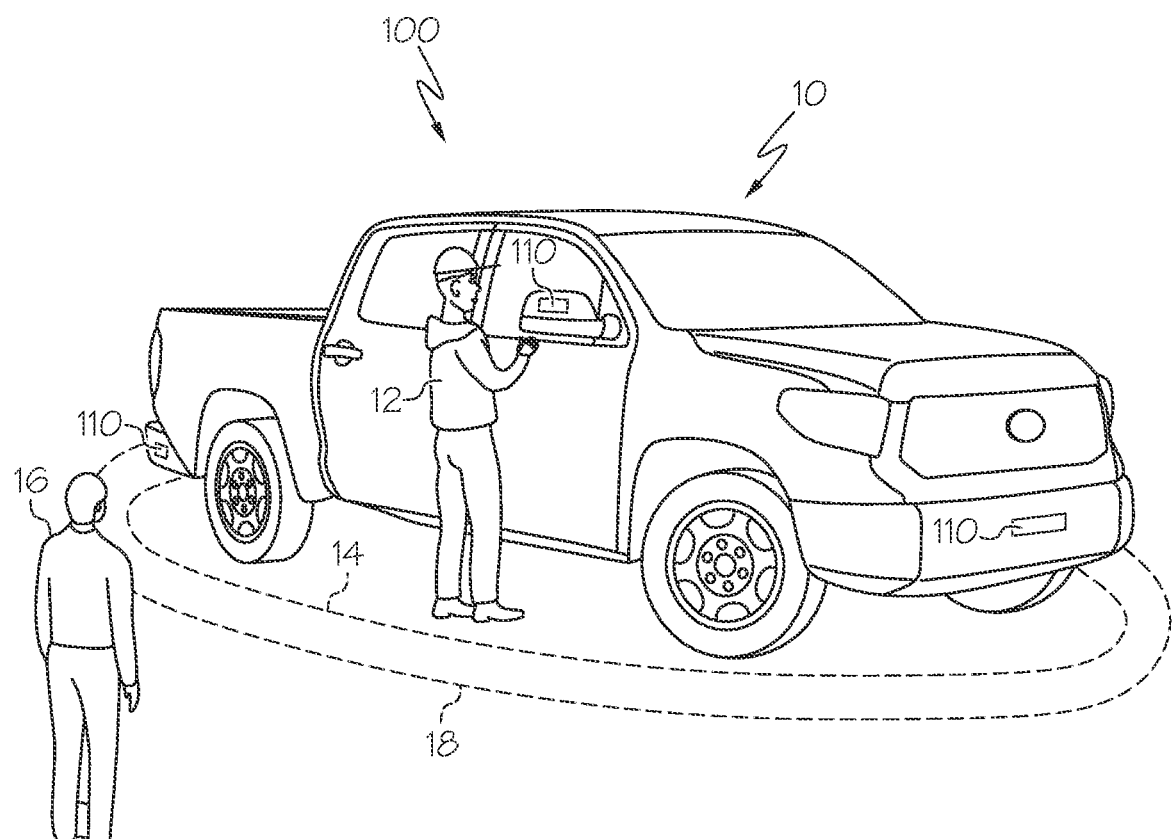
FIG. 1 depicts a perspective view of a vehicle having a system for monitoring the environment surrounding the vehicle, according to one or more embodiments shown or described herein.

Referring now to FIG. 1, a vehicle 10 including a system 100 for detecting objects 16 approaching the vehicle 10 when an ignition switch of the vehicle 10 is off is depicted. The system 100 includes one or more components for determining a proximity of a user 12 to the vehicle 10, for determining the one or more objects 16 approaching the vehicle 10, and for taking a responsive action, such as generating an alert to the user 12, regarding the one or more objects 16. The system 100 may initiate operation, adjust one or more operating conditions, and take one or more responsive actions based on user input.

Specifically, FIG. 1 shows the vehicle 10 including one or more sensors 110 that are configured to detect a presence of the user 12 within a proximity of the vehicle 10 and/or detect the one or more objects 16 approaching the vehicle 10, as described in greater detail herein. For example, the one or more sensors 110 may be cameras, ultrasonic sensors, radar sensors, laser imaging, detection, and ranging (LiDAR)

sensors, and the like. The one or more sensors 110 may be positioned on the exterior of the vehicle 10. For instance, the one or more sensors 110 may be located on the front bumper of the vehicle 10, the rear bumper of the vehicle 10, a side mirror of the vehicle 10, a body panel of the vehicle 10, and/or the like. In some embodiments, the one or more sensors 110 may be positioned within the interior or cabin of the vehicle 10. For instance, in some embodiments, the one or more sensors 110 may be positioned on a rear-view mirror of the vehicle 10.

In embodiments, the one or more sensors 110 may be configured to provide data to assist in manual, semi-autonomous, or autonomous operation of the vehicle 10 when the ignition switch of the vehicle 10 is turned on. For example, and without limitation, the one or more sensors 110 may assist in autonomous lane keeping of the vehicle 10, adaptive cruise control of the vehicle 10, blind spot monitoring for the vehicle 10, intelligent parking of the vehicle 10, and/or the like. That is, the one or more sensors 110 may be existing vehicle sensors that are further used as described herein.

When the ignition switch of the vehicle 10 is turned off, the one or more sensors 110 may be configured to adjust functionality to detect a presence of the user 12 within a threshold proximity 14 of the vehicle 10 (indicated by a dashed boundary line surrounding the vehicle 10 in FIG. 1) and/or detect the one or more objects 16 approaching the vehicle 10. The threshold proximity 14 is generally a predetermined proximity to the vehicle 10. In embodiments, as will be discussed in further detail below, the user 12 may specify the size of the threshold proximity 14, or the distance the threshold proximity 14 extends from the vehicle 10. In such embodiments, the threshold proximity 14 may be a static value or data point. The system 100 may analyze sensor data from the one or more sensors 110 with respect to the user-specified threshold proximity 14. In some embodiments, the threshold proximity 14 may be a geofenced area, or a virtual perimeter, surrounding the vehicle 10. For instance, the threshold proximity 14 may be an outer limit of a radio sensing system (e.g., a radio frequency identification (RFID) sensing system or the like). The one or more sensors 110 may detect the one or more objects 16 within a second proximity 18 of the vehicle 10 and possibly approaching the vehicle 10. In embodiments, the user 12 may specify the size of the second proximity 18, or the distance the second proximity 18 extends from the vehicle 10. In such embodiments, the second proximity 18 may be a static value or data point. The system 100 may analyze sensor data from the one or more sensors 110 with respect to the user-specified second proximity 18. While the object 16 is depicted as a person in FIG. 1, it should be appreciated that the object 16 may be a person, vehicle, animal, or any other object besides the user 12, particularly objects that may potentially cause harm to the user, may be of interest to the user, or the like.

The threshold proximity 14 is generally tailored to an area surrounding the vehicle 10 where the user 12 may not be focused on the environment surrounding the vehicle 10. For instance, the threshold proximity 14 may generally encompass an area surrounding the vehicle 10 where the user 12 may be facing the vehicle 10 (e.g., with his or her back facing away from the vehicle), such as to perform one or more tasks, including, but not limited to, removing items from the vehicle 10, filling the vehicle 10 with gas, filling the tires of the vehicle 10 with air, and the like. The second proximity 18 is generally tailored to an area surrounding the vehicle 10 where the one or more objects 16 may be of interest to the user 12. The closer one or more objects 16 are to the user 12 and/or the vehicle 10, the greater the interest the one or more objects 16 may be to the user 12. Therefore, in embodiments, the second proximity 18 may define an area surrounding the vehicle 10 close enough to the vehicle 10 such that the one or more objects 16 detected within the second proximity 18 and moving toward the vehicle 10 are reasonably indicative of an interest or concern to the user 12. In other words, it may be unnecessary or cumbersome for the system 100 to take a responsive action in response to determining that one or more objects 16 are within a 100 meter radius of the vehicle 10, for instance, and moving toward the vehicle 10, because the one or more objects 16 close to the 100 meter radius may be distanced from the user 12 such that the user 12 is not interested or concerned with such objects 16 (e.g., objects that are sufficiently far away from a user). Additionally, it may be unnecessary or cumbersome for the system 100 to take a responsive action in response to determining that one or more objects 16 are within a 100 meter radius of the vehicle 10, for instance, and moving toward the vehicle 10, because the number of objects 16 within the radius and moving toward the vehicle 10 may be so great that the system 100 overwhelms the user 12 with responsive actions, such as alerts, for each object 16 within the radius and moving toward the vehicle 10. However, in embodiments, the second proximity 18 may define an area surrounding the vehicle 10 large enough to allow the user 12 to react to the responsive action taken by the system 100 when it is determined that one or more objects 16 are within the second proximity 18 and moving toward the vehicle 10. In other words, if the second proximity 18 is too small, by the time the system 100 provides a warning or other responsive action to the user 12 when one or more objects 16 are within the second proximity 18 and moving toward the vehicle 10, the user 12 may be unable to respond to the one or more objects 16 prior to the one or more objects 16 striking the user 12 and/or the vehicle 10, for instance. For example, a boundary of the threshold proximity 14 may be, but is not limited to, 10 meters or less, 7.5 meters or less, 5 meters or less, 2.5 meters or less, and/or the like. In another example, a boundary of the second proximity 18 may be, but is not limited to 20 meters or less, 15 meters or less, 10 meters or less, 7.5 meters or less, 5 meters or less, 2.5 meters or less, and/or the like.

The threshold proximity 14 and/or the second proximity 18 may take any desirable shape. In some embodiments, the threshold proximity 14 and/or the second proximity 18 may be define a symmetrical area in a horizontal plane (e.g., on the ground) with respect to a line passing through the center point of the vehicle 10. In some embodiments, the threshold proximity 14 and/or the second proximity 18 may define an asymmetrical area in a horizontal plane (e.g., on the ground) with respect to a line passing through the center point of the vehicle 10. For instance, from data supplied from the one or more sensors 110, a processor 202 (FIG. 2) of the system 100 may determine that the passenger side of the vehicle 10 is directly adjacent to a wall or other structure. In such embodiments, the threshold proximity 14 and/or the second proximity 18 may not extend around the passenger side of the vehicle 10, or extend around the passenger side of the vehicle 10 only to the wall or other structure adjacent the passenger side of the vehicle 10. In embodiments, the threshold proximity 14 and the second proximity 18 may define areas of the same size and/or shape. In some embodiments, the threshold proximity 14 may define a unique size and shape from the second proximity 18.

Figure 2:
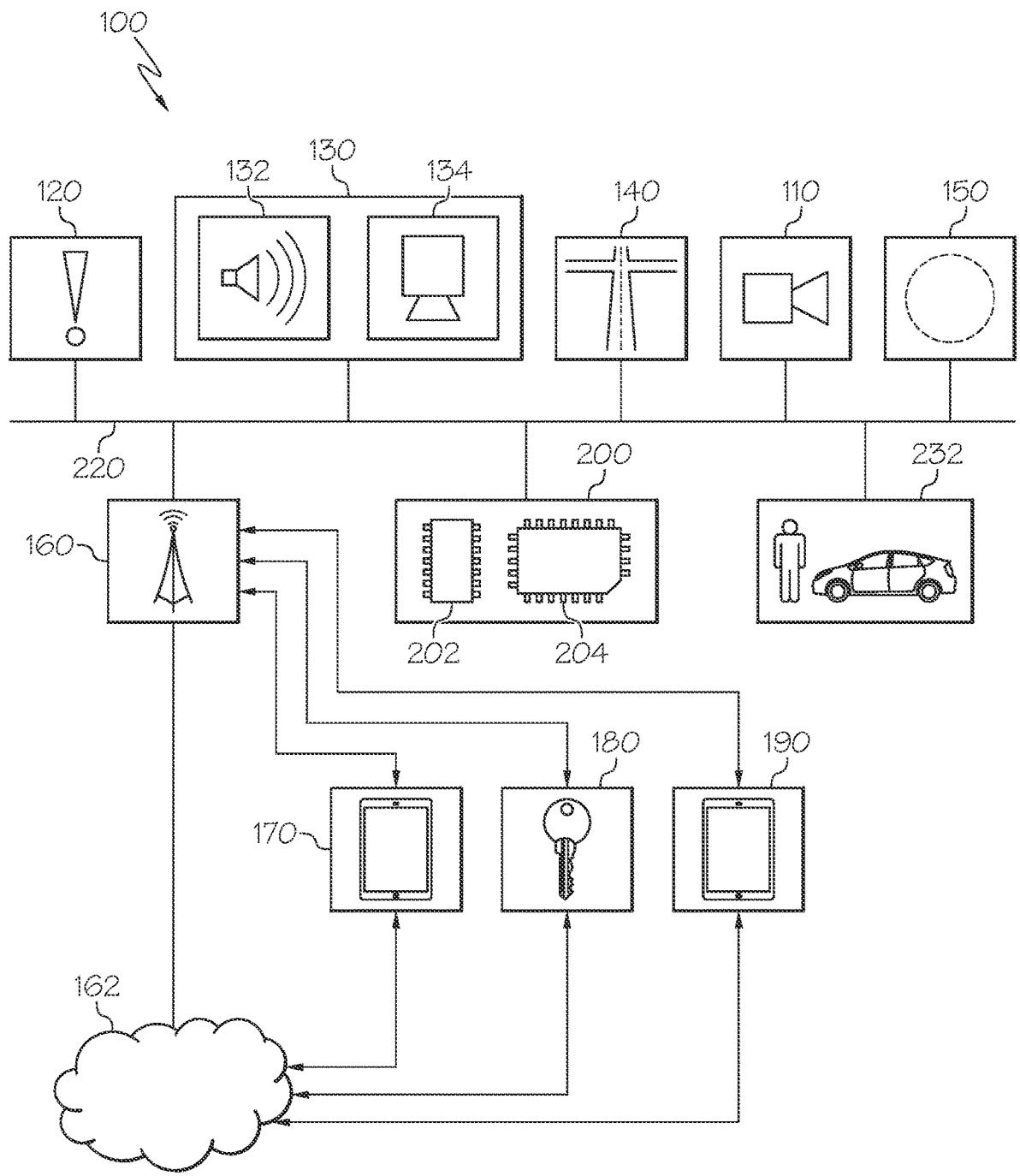
FIG. 2 schematically depicts the system for monitoring the environment surrounding the vehicle of the vehicle of FIG. 1, according to one or more embodiment shown or described herein.

Referring to FIGS. 1 and 2, the system 100 includes one or more internal hardware components. The system 100 includes a controller 200 including a processor 202 and a memory module 204. The controller 200 may be an electronic control unit in some embodiments. The system may further include an alarm module 120, an alert module 130, a navigation module 140, the one or more sensors 110, a proximity module 150, an item differentiation module 230, and network interface hardware 160. In some embodiments, the network interface hardware 160 may communicatively couple the system 100 with an external network 162 (e.g., a cloud network) and/or one or more user devices 170, one or more key fobs 180, one or more external devices 190, and the like. The various components of the system 100 may be communicatively coupled to one another via a bus 220. The system 100 may be coupled to a power supply. The power supply may be a battery coupled to a motor of the vehicle 10. In embodiments, the power supply may be a 12-volt lead-acid battery. In embodiments, the power supply may be a hybrid battery, such as lithium-ion battery or a nickel-metal hydride battery. In embodiments, the system 100 may be coupled to multiple power supplies, such as a 12-volt lead-acid battery and a hybrid battery. In some embodiments, the power supply may be a separate battery for operation of the system 100 that is not coupled to a motor of the vehicle 10. The system 100 may draw power from the power supply while the system 100 is operating. The system 100 may further be coupled to one or more hardware components of the vehicle 10, such as the ignition switch of the vehicle 10.

The processor 202 may include any processing component(s) configured to receive and execute instructions. The instructions may be in the form of one or more processor-readable instructions or instruction sets stored in the memory module 204. Accordingly, the processor 202 may be an electric controller, an integrated circuit, a microchip, a computer, or any other computing device. The processor 202 is communicatively coupled to the other components of the system 100 via the bus 220. Accordingly, the bus 220 may communicatively couple any number of processors 202 with one another, and allow the components coupled to the bus 220 to operate in a distributed computing environment. In some embodiments, the bus 220 is a CAN bus. Each of the components may operate as a node that may send and/or receive data. Furthermore, while the embodiment depicted in FIG. 2 includes a single processor 202, some embodiments may include more than one processor 202 without departing from the scope of the present disclosure.

As noted above, the controller 200 includes the memory module 204. The memory module 204 is communicatively coupled to the one or more processors 202. The memory module 204 may include RAM, ROM, flash memories, hard drives, or any device capable of storing processor-readable instructions such that the processor-readable instructions may be accessed and executed by the one or more processors 202. The processor-readable instructions may include logic or algorithm(s) written in any programming language of any generation (e.g., 1GL, 2GL, 3GL, 4GL, or 5GL) such as, for example, machine language that may be directly executed by the processor 202, or assembly language, object-oriented programming (OOP), scripting languages, microcode, and the like, that may be compiled or assembled into processor-readable instructions and stored on the memory module 204. In some embodiments, the processor-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

As noted above, the system 100 includes the bus 220. The bus 220 may be formed from any medium that is capable of transmitting a signal such as, for example, conductive wires, conductive traces, optical waveguides, or the like. Moreover, the bus 220 may be formed from a combination of mediums capable of transmitting signals. In one embodiment, the bus 220 includes a combination of conductive traces, conductive wires, connectors, and buses that cooperate to permit the transmission of electrical data signals to components such as processors, memories, sensors, input devices, output devices, and communication devices. Accordingly, the bus 220 may include a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The bus 220 communicatively couples the various components of the system 100. As used herein, the term "communicatively coupled" means that coupled components are capable of exchanging data signals with one another such as, for example, electrical signals via conductive medium, electromagnetic signals via air, optical signals via optical waveguides, and the like.

The proximity module 150 may include an RFID sensing system, and/or the like. Generally, the proximity module 150 may include any device capable of setting a virtual perimeter or boundary around the vehicle 10. That is, the proximity module 150 may be any device able to define distances and/or detect distances around the vehicle 10. For instance, an RFID device of the proximity module 150 may define a boundary around the vehicle 10 as the outer limit of its signal strength. The proximity module 150 may also include a GPS device or any other device capable of determining the position of the vehicle 10. The system 100 may determine the position of the user 12 or one or more objects 16 with reference to the determined position of the vehicle 10. The memory module 204 may include proximity instructions executable by the processor 202. Upon executing the proximity instructions, the processor 202 may instruct the proximity module 150 to determine a threshold proximity 14 and/or a second proximity 18 around the vehicle 10, as will be discussed in more detail below. The proximity module 150 may further be configured to receive GPS data from a user device 170 and/or a radio signal from a key fob 180. The proximity module 150 may further include one or more data processing components, such that the proximity module may determine the distance of the user device 170 from the vehicle 10 and/or the position of the key fob 180 within the threshold proximity 14, for instance.

The one or more sensors 110 may be configured to detect items (e.g., the user 12 and the one or more objects 16) in the environment surrounding the vehicle 10. In some embodiments, the detection range of the one or more sensors 110 may be limited to the areas defined by the threshold proximity 14 and/or the second proximity 18, as set by the user 12 and/or determined by the proximity module 150. Accordingly, in such embodiments, the one or more sensors 110 may be unable to detect the one or more objects 16 when the one or more objects 16 are outside the second proximity 18. In some embodiments, the detection range of the one or more sensors 110 may extend beyond the areas defined by the threshold proximity 14 and/or the second proximity 18. In such embodiments, for instance, the one or more sensors 110 may detect the one or more objects 16 regardless of whether the one or more objects 16 are within or outside the second proximity 18. The one or more sensors 110 generate sensor data. The sensor data may encompass still image data, video data, radar data, ultrasonic data, LiDAR data, and/or the like depending on the one or more sensors 110 utilized in the system 100. A "frame" of sensor data, as used herein, refers to a set of sensor data collected by the one or more sensors 110 at a fixed point in time. The memory module 204 may include sensor instructions executable by the processor 202. Upon executing the sensor instructions, the processor 202 may instruct the one or more sensors 110 to detect the environment around the vehicle 10. Moreover, upon executing the sensor instructions, the processor 202 may analyze the sensor data received from the one or more sensors 110, as discussed below.

The item differentiation module 230 may be configured to receive sensor data from the sensors 110 and differentiate between multiple items detected by the one or more sensors 110 in the environment surrounding the vehicle 10 based on the sensor data. For instance, the item differentiation module 230 may include one or more item recognition algorithms to differentiate between persons, vehicles, animals, bicycles, and the like. Any known or yet-to-be-developed item recognition algorithm may be used to extract the items from the sensor data from the one or more sensors 110. Example item recognition algorithms include, but are not limited to, scale-invariant feature transform ("SIFT"), speeded up robust features ("SURF"), and edge-detection algorithms. In some embodiments, the item differentiation module 230 may be able to differentiate a first person in the environment surrounding the vehicle 10 from a second person in the environment surrounding the vehicle 10. For instance, through one or more recognition algorithms, such as facial recognition algorithms or like, the item differentiation module 230 may differentiate the user 12 from the one or more objects 16, which may include unknown persons. In some embodiments, the item differentiation module 230 may differentiate the user 12 from the one or more objects 16 by determining that a person exiting the vehicle 10, or nearest the vehicle 10 in the first frame of sensor data received from the one or more sensors 110 is the user 12. The item differentiation module 230, as discussed herein, may generate differentiation data that may be analyzed along with the sensor data from the one or more sensors 110 by the processor 202. For instance, the item differentiation module 230 may generate frames of differentiation data, each frame of differentiation data corresponding to a single frame of sensor data that the item differentiation module 230 used to generate each respective frame of differentiation data. The item differentiation module 230 may mark and/or label items in the sensor data.

The alarm module 120 may include a siren or other device for generating noises audible outside of the vehicle 10. In embodiments, the alarm module 120 may include one or more lights configured to emit light outside of the vehicle 10. In embodiments, the alarm module 120 may include the headlights, taillights, brake lights, and the like of the vehicle 10. In embodiments, the alarm module 120 may include any display device on the vehicle 10 capable of being perceived from outside the vehicle 10. In some embodiments, the alarm module 120 may include the car horn of the vehicle 120. The memory module 204 may include alarm instructions executable by the processor 202. Upon executing the alarm instructions, the processor 202 may instruct one or more components of the alarm module 120, such as lights, sirens, and/or the like, to activate in any desirable pattern.

The alert module 130 may include any hardware device capable of generating an audial or visual alert to gather the attention of the user 12. The alert module 130 may include an audio system, such as the audio system 132 of the vehicle 10. The alert module 130 may include a display system, such as the display system 134 of the vehicle 10. The audio system 132 and the display system 134 may be built-in systems of the vehicle 10 that are operational outside of the system 100. For instance, the audio system 132 may the speaker system of the vehicle 10. The display system 134 may be a screen on the head unit of the vehicle 10, a heads-up display of the vehicle 10, a gauge on the gauge unit of the vehicle 10, and the like, that may provide the user 12 with information related to the operation of the vehicle 10 while the ignition switch of the vehicle 10 is on. The memory module 204 may include alert instructions executable by the processor 202. Upon executing the alert instructions, the processor 202 may instruct one or more components of the alert module 130 to provide one or more alerts to the user 12, as will be discussed in more detail below.

In embodiments, the system 100 includes the navigation module 140. The navigation module 140 may store common travel patterns of the user 12 and/or the vehicle 10 and further determine a current position of the vehicle 10. The navigation module 140 may be able to obtain and update positional information based on geographical coordinates (e.g., latitudes and longitudes), or via electronic navigation where the navigation module 140 electronically receives positional information through satellites. In some embodiments, the navigation module 140 may include a GPS system. The navigation module 140 may determine common travel patterns of the user 12, including travel locations and times, based on one or more machine learning algorithms. In some embodiments, the navigation module 140 may further determine common travel patterns of the user 12 based on user-input information such as a home address, a work address, and the like. The processor 202 may receive navigation data, including common travel pattern data and current vehicle 10 position data, from the navigation module 140. By executing navigation instructions stored on the memory module 204 and based on navigation data, the processor 202 may determine whether the vehicle 10 is within a common travel pattern of the user 12. The system 100 may determine to initiate a watch mode based on the determination that the vehicle 10 is within or outside of a common travel pattern, as discussed in more detail below.

The network interface hardware 160 may be communicatively coupled to the controller 200 via the bus 220. The network interface hardware 160 may be any device capable of transmitting and/or receiving data with external devices or servers directly or via a network, such as an external network 162. Accordingly, the network interface hardware 160 can include a communication transceiver for sending and/or receiving any wired or wireless communication. For example, the network interface hardware 160 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, the network interface hardware 160 may include hardware configured to operate in accordance with the Bluetooth wireless communication protocol and may include a Bluetooth send/receive module for sending and receiving Bluetooth communications.

In some embodiments, the system 100 may be communicatively coupled to a network such as the external network 162. In embodiments, the external network 162 may include one or more computer networks (e.g., a cloud network, a personal area network, a local area network, grid computing network, wide area network, and the like), cellular networks, satellite networks, mesh networks, and/or a global positioning system and combinations thereof. Accordingly, the system 100 can be communicatively coupled to the external network 162 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Figure 3:
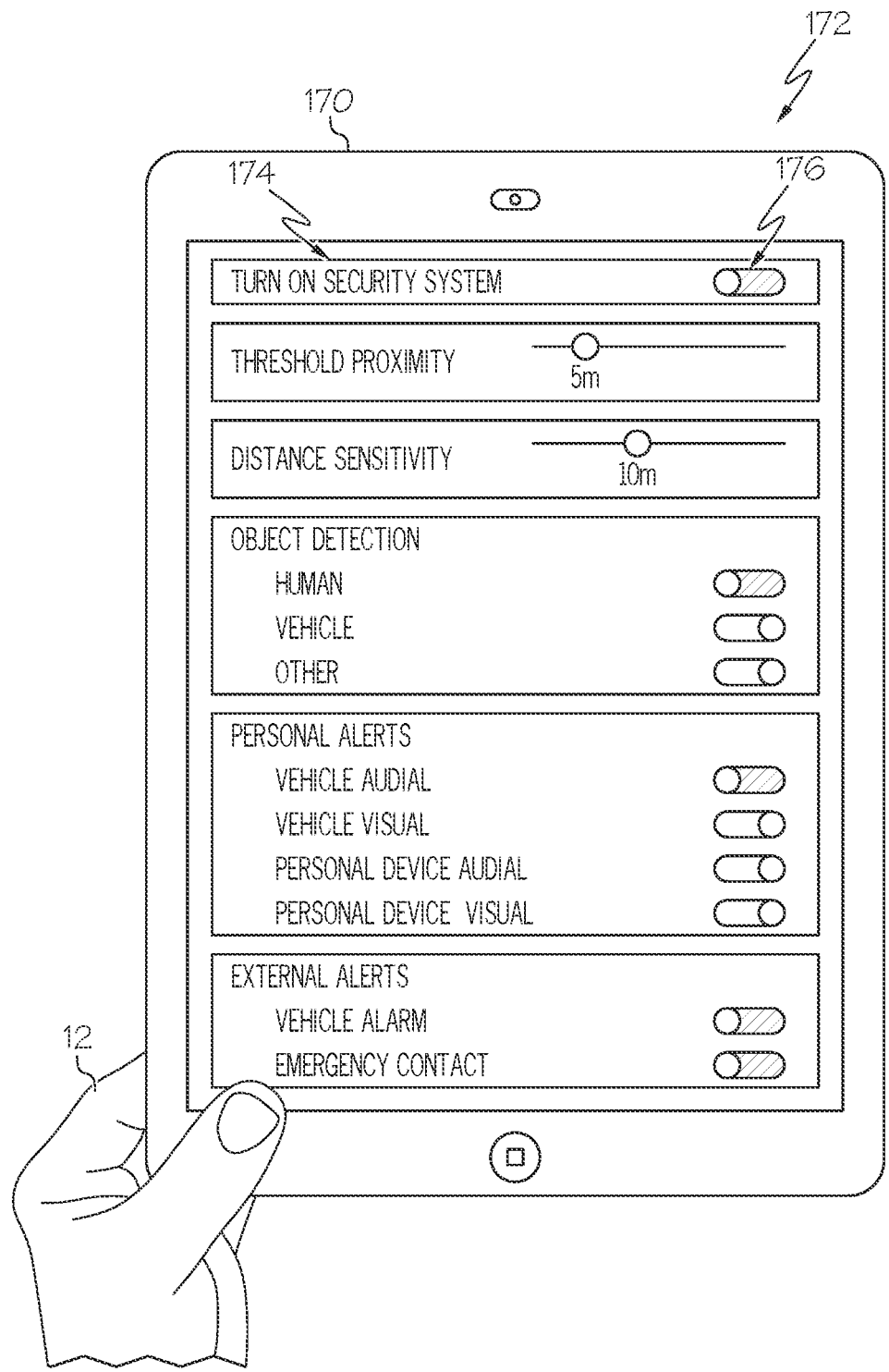
FIG. 3 depicts a user device coupled to the system of FIG. 2, according to one or more embodiments shown or described herein.

In some embodiments, the network interface hardware 160 may communicatively couple the system 100 with one or more user devices 170. Referring now to FIG. 3, in addition to FIGS. 1 and 2, the one or more user devices 170 may be a personal electronic device of the user 12. The one or more user devices 170 may generally be used as an interface between the user 12 and the other components connected to the network interface hardware 160. Thus, the one or more user devices 170 may be used to perform one or more user-facing functions, such as receiving one or more inputs from the user 12 or providing information to the user 12. Accordingly, the one or more user devices 170 may include at least a display and/or input hardware. In embodiments, the one or more user devices 170 may be communicatively paired with the system 100 such that the one or more user devices 170 transmits GPS or other location data to the controller 200 and/or the proximity module 150. In embodiments, the user 12 may instruct operation of the alert module 130, alarm module 120, and/or other system 100 components through the one or more user devices 170. FIG. 3 depicts an example embodiment of the one or more user devices 170. The one or more user devices 170 may be a cellular phone, tablet, or personal computer of the user 12. The one or more user devices 170 may include a display 172 such as, for example, a cathode ray tube, light emitting diodes, a liquid crystal display, a plasma display, or the like. Moreover, the display 172 may be a touchscreen that, in addition to providing an optical display, detects the presence and location of a tactile input upon a surface of or adjacent to the display 17. It should be appreciated that the display 172 of the user device 170 is merely an example of a user interface that the user 12 may provide operations instructions to the system 100 from. For instance, in embodiments, the system 100 may provide a display similar to the display 172, including operational prompts 174 and feedback actuators 176, on the display system 134 of the vehicle 10. In embodiments, the display system 134 may be a screen on the head unit of the vehicle 10 that dually operates as an optical display and a touchscreen, for instance. In such embodiments, the user 12 may provide the system 100 with operational instructions through the display system 134 instead of, or in addition to, the user device 170. Similarly, in embodiments, the audio system 132 may include one or more microphones in the vehicle 10. The user 12 may provide instructions by speaking into the microphone of the audio system 132 of the vehicle 10. In such embodiments, the user 12 may provide the system 100 with operational instructions through the audio system 132 instead of, or in addition to, the user device 170 and/or the display system 134

In some embodiments, the network interface hardware 160 may communicatively couple the system 100 with one or more key fobs 180 associated with the vehicle 10. In embodiments, the one or more key fobs 180 may transmit fob data to the controller 200 and/or the proximity module 150. In embodiments, the one or more key fobs 180 may transmit fob data to the controller 200 via radio signals. The fob data generated by the one or more key fobs 180 and the location data generated by the one or more user devices 170 may be collectively described as "external data" herein. External data may also refer to any data communicated to the controller 200 and/or other system components, such as the proximity module 150, from a device that is communicatively coupled to the system 100 through the network interface hardware 160.

In some embodiments, the network interface hardware 160 may communicatively couple the system 100 with one or more external devices 190. The one or more external devices 190 may be any database server or electronic device belonging to the user 12 or a third party. For instance, the one or more external devices may contain one or more storage devices for storing data pertaining to the operation of the system 100. For instance, the one or more external devices 190 may store data pertaining to the location of the vehicle 10, sensor data collected by the one or more sensors 110, and differentiation data generated by the item differentiation module 230 while the system 100 is in a watch mode, data pertaining to the one or more objects 16 that cause the processor 202 to initiate a responsive action via the alert module 130, for instance, and the like. The one or more external devices 190 may be any device that contains hardware that may be used as an interface between the system 100 and an individual, such as the user 12 or an interested third party. For example, the one or more external devices 190 may receive and display information to an interested third party. In some embodiments, the one or more external devices 190 may be a database server or electronic device associated with an emergency response team. For instance, the system 100 may share data with a government-operated body such as a police force, fire department, and the like. In some embodiments, the system 100 may share data with independent emergency response organizations that may then coordinate with one or more government-operated bodies. In some embodiments, the one or more external devices 190 may belong to an emergency contact, as selected by the user 12. For instance, the user 12 may designate a family member, friend, or any other person as an emergency contact. When the processor 202 determines that the user 12 is within the threshold proximity 14 and determines that one or more objects 16 are within the second proximity 18 and moving toward the vehicle 10, the processor 202 may push an alert notification to the one or more external devices 190. The alert notification pushed to the one or more external devices 190 may be an audial or visual alert. The notification pushed to the one or more external devices 190 may further include location data relating to the current location of the vehicle 10.

Figure 4:
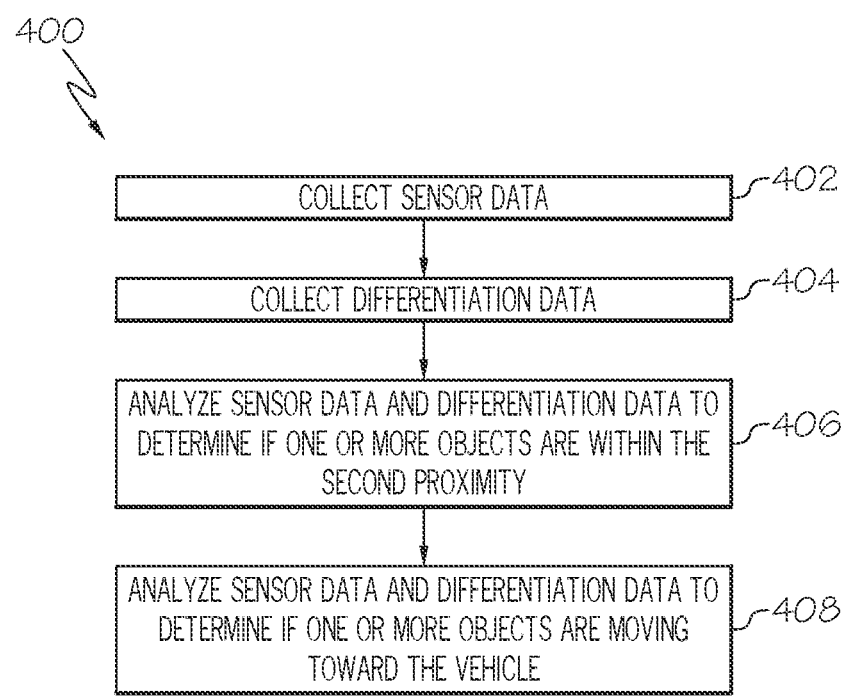
FIG. 4 schematically depicts a method of determining if one or more objects are approaching the vehicle of FIG. 1, according to one or more embodiments shown or described herein.

FIG. 4 schematically depicts a method 400 of determining whether the one or more objects 16 are within the second proximity 18 and approaching the vehicle 10. The method 400 may be executed based on instructions stored in the memory module 204 that are executed by the processor 202. Referring now to FIGS. 1-4, at block 402 of the method 400, the system 100 collects sensor data from the one or more sensors 110. The one or more sensors 110 may generate the sensor data in the form of frames of sensor data, where each frame of sensor data is a set of sensor data collected at a point in time. Accordingly the one or more sensors 110 may continuously collect sensor data while the system 100 is operating in a watch mode and assemble the sensor data in a set of sequential frames. At block 404 of the method 400, the item differentiation module 230 generates differentiation data from the sensor data collected at step 402. The item differentiation module 230 may analyze each frame of sensor data to generate a corresponding frame of differentiation data. Each frame of differentiation data may include identified and labeled items in the environment surrounding the vehicle 10. Accordingly, the differentiation data differentiates the user 12 from the one or more objects 16. Moreover, the differentiation data may differentiate between various types of one or more objects 16, such as persons, vehicles, animals, and the like.

At block 406, the sensor data and differentiation data are analyzed to determine whether the one or more objects 16 are within the second proximity 18. For instance, following blocks 402 and 404, the processor 202 may receive frames of sensor data from the one or more sensors 110 and frames of differentiation data from the item differentiation module 230. By analyzing a pair of frames of sensor data and differentiation data, that is, by analyzing a frame of sensor data and a frame of differentiation data generated at the same point in time, the processor 202 may determine the location and type of each object 16 in the environment surrounding the vehicle 10 at that particular point in time. As an example, the processor 202 may collect a first frame of differentiation data, which indicates the presence of the user 12 and one or more objects 16 (such as a first vehicle, a first unknown person, and a second unknown person) in the environment surrounding the vehicle 10. The processor may locate the labeled one or more objects 16 in the sensor data and determine a distance between the vehicle 10 and the one or more objects 16. In some embodiments, for instance when the one or more sensors 110 of the vehicle 10 are LiDAR sensors, the sensor data may already contain data indicating the distance between the vehicle 10 and the one or more objects 16. In other embodiments, for instance, when the one or more sensors 110 of the vehicle 10 are cameras, the processor 202 may run one or more object recognition or image processing algorithms to further determine the distance of the identified one or more objects 16 in the sensor data to the vehicle 10. The processor 202 may compare the distances of the one or more objects 16 from the vehicle 10 with the boundary of the second proximity 18 around the vehicle 10, as set by the user, for instance, and determine if the one or more objects 16 are within or outside the second proximity 18.

Still referring to FIG. 4, at block 408, the sensor data and differentiation data are further analyzed in conjunction to determine if the one or more objects 16 determined to be within the second proximity at block 406 are moving toward the vehicle 10. For instance, after identifying a particular object 16 is within the second proximity 18 at block 406, the processor 202 may compare the distance between the object 16 and the vehicle 10 at time t, with the distance between the object 16 and the vehicle 10 at time t−1. Based on this comparison, the processor 202 may determine if the object 16, which was determined to be within the second proximity 18, is moving toward the vehicle 10. In some embodiments, the processor 202 may process the sensor data captured by the one or more sensors 110 and the differentiation data generated by the item differentiation module 230 using any known or yet-to-be developed image processing algorithm applied to the image data and/or the differentiation data. Example image processing algorithms include, but are not limited to, kernel-based tracking (such as, for example, mean-shift tracking) and contour processing algorithms. In general, the processor 202, through the one or more image processing algorithms, may determine items and the movement of items in the environment surrounding the vehicle 10.

While FIG. 4 has been discussed with reference to determining the position and movement of the one or more objects 16 in the environment surrounding the vehicle 10, it should be appreciated that the processor 202 may implement similar computational methods to determine or track the position of the user 12. In other words, the differentiation data generated by the item differentiation module 230 may label the user 12. By analyzing corresponding frames of differentiation data and sensor data collected at blocks 402 and 404 of the method 400, the processor 202 may determine the distance the user 12 is from the vehicle 10 by the same methods described above with reference to the one or more objects 16. In other words, the processor 202 may compare the distance the user 12 is from the vehicle 10 with the boundary of the threshold proximity 14, as set by the user for instance, and determine if the user 12 is within or outside the threshold proximity 14. In some embodiments, the processor 202 may further determine the position of the user 12 in relation to the threshold proximity 14 with proximity data generated from the proximity module 150. For instance, the user device 170 may transmit GPS data to the proximity module 150. The proximity module 150 may analyze the GPS data received from the user device 170 in relation to the GPS location of the vehicle 10, as determined by the proximity module 150. By comparing the GPS location of the vehicle 10 with the GPS location of the user device 170, the proximity module 150 may calculate a distance of the user device 170 from the vehicle 10 and transmit the distance to the processor 202 as proximity data. Based on the proximity data, the processor 202 may determine if the user device 170 is within or outside the threshold proximity 14, as set by the user 12. Therefore, the processor 202 may use the proximity data in conjunction with, or instead of, the sensor data and differentiation data to determine the location of the user 12 within or outside of the threshold proximity 14. In some embodiments, the one or more key fobs 108 may transmit fob data to the proximity module 150, which analyzes the fob data received from the key fob 108 in relation to the threshold proximity 14, which may be an outer limit of an RFID sensing system of the proximity module 150, to generate a set of proximity data. Based on the proximity data, the processor 202 may determine if the key fob 108 is within or outside the threshold proximity 14. The processor 202 may use the proximity data in conjunction with, or instead of, the sensor data and differentiation data to determine the location of the user 12 within or outside of the threshold proximity 14.

Figure 5:
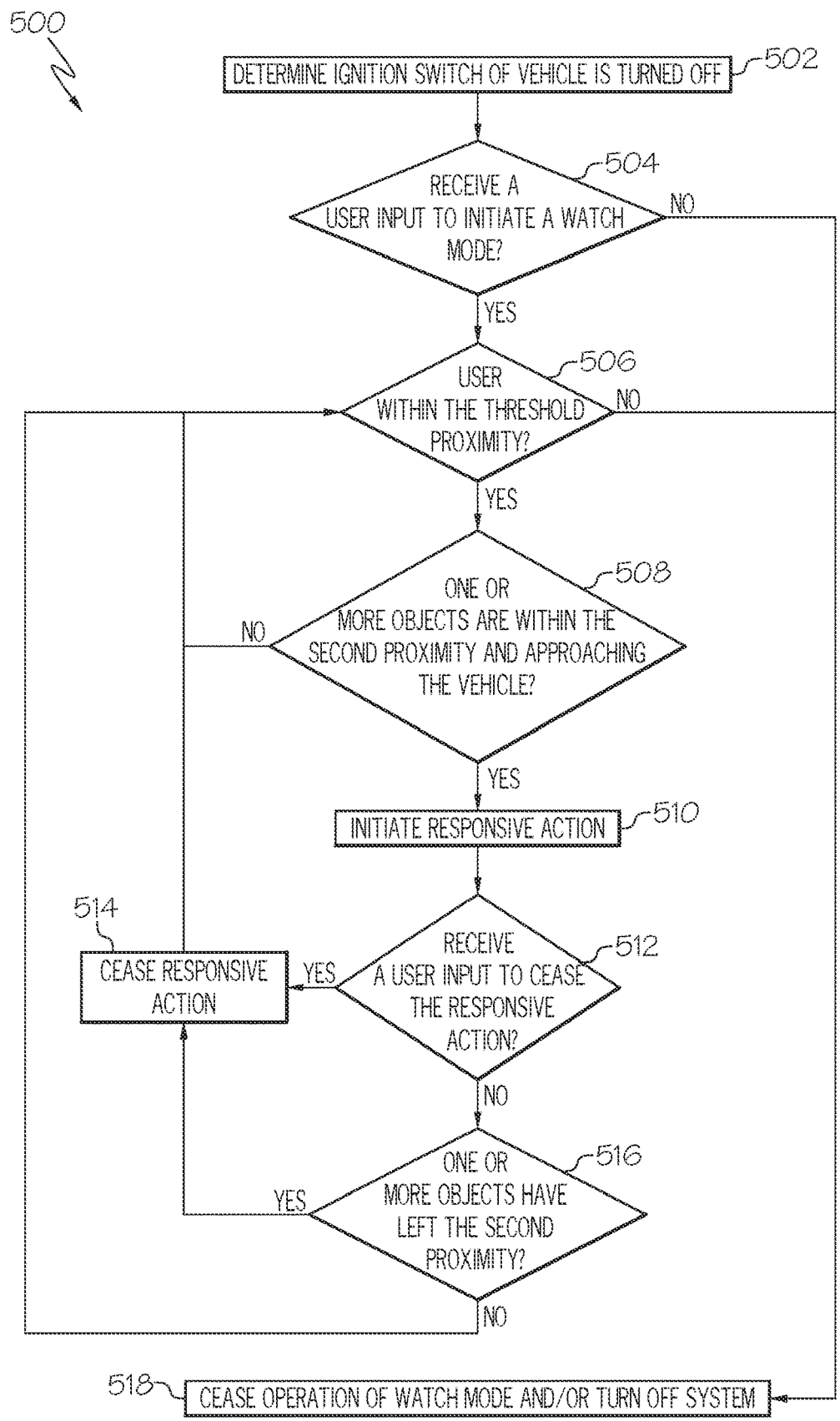
FIG. 5 schematically depicts a method of operation of the system of FIG. 2, according to one or more embodiments shown or described herein.

FIG. 5 schematically depicts a method 500 of operating the system 100. Referring now to FIGS. 1-5, at block 502 of the method 500, the system 100 determines that the ignition switch of the vehicle 10 is switched off.

Following this determination, at block 504, a determination is made whether a user-provided input is received to initiate a watch mode. For instance, the system 100 may provide an operational prompt to the user 12 on whether the user 12 wishes to initiate a watch mode of the system 100. For instance, the display 172 of the one or more user devices 170 may include one or more operational prompts 174. One or more feedback actuators 176 may be coupled to each of the one or more operational prompts 174, such that the user 12 may provide the system 100 with discrete instructions concerning each operational prompt 174. The one or more feedback actuators 176 may be virtual buttons, dials, switches, slides, text boxes, or any other interface that allows the user 12 to input operational preferences into the system 100. More particularly, the processor 202 may send an operational prompt 174 (via the "turn on security system" operational prompt 174) to the user 12 to determine whether the user 12 wishes to turn on the watch mode of the system 100. If the user 12 selects that she does not wish to turn on the watch mode of the system 100, the system 100 determines that a user input to initiate a watch mode was not received at block 504, and the system may proceed to block 518 and turn off. That is, the various components of the system 100 may no longer draw power from the power supply. If the user 12 selects that she wishes to turn on the watch mode of the system 100, the system 100 determines that a user input to initiate the watch mode was received at block 504, and the system 100 may proceed to block 506.

Prior to proceeding to block 506, the user 12 may provide the system 100 with additional instructions on a variety of operational settings of the system 100. For instance, the user 12 may set the threshold proximity 14 (via the "threshold proximity" operational prompt 174) and the second proximity 18 (via the "distance sensitivity" operational prompt 174) surrounding the vehicle 10. In embodiments, the user 12 may also direct the system 100 on which one or more objects 16 the user 12 wishes the system 100 to provide an alert to the user 12 regarding. For instance, in some cases, the user 12 may only be concerned with unknown persons approaching the vehicle 10. Therefore, the user 12 may effectively instruct the system 100 not to take a responsive action when the processor 202 determines that the user 12 is within the threshold proximity 14 and determines that one or more objects 16 are within the second proximity 18 and moving toward the vehicle 10, when the one or more objects 16, as determined by the item differentiation module 230, are not persons. In embodiments, the user 12 may further instruct the system 100 to provide personal alerts through any of the one or more audio systems 132 (via the "vehicle audial" operational prompt 174), the one or more display systems 134 (via the "vehicle visual" operational prompt 174), and the user device 170 (via the "personal device audial" and "personal device visual" operational prompts 174). In embodiments, the user 12 may further instruct the system 100 which, if any, external alerts to initiate. For instance, the user 12 may decide whether to initiate an alarm through the alarm module 120 (via the "vehicle alarm" operational prompt 174) and whether to provide an alert to the one or more external devices 190 (via the "emergency contact" operational prompt).

In embodiments, the user 12 may provide detailed operational instructions regarding the operation of the system 100. For instance, by clicking, or otherwise selecting, any of the one or more operational prompts 174, the display 172 may change to provide additional prompts related to detailed operation of the system 100. For instance, by selecting the "threshold proximity" operational prompt 174, the user 12 may further specify a desired shape of the threshold proximity 14 surrounding the vehicle 10, such as circular or square. By selecting any of the "personal alerts" operational prompts 174, the user 12 may specify the volume of the audial alerts, the type of visual alerts (e.g., textual messages or images), and the like. Similarly, by selecting the "emergency contact" operational prompt 174, the user 12 may input the contact information, such as a cellular phone number or the like, of the one or more external devices 190 that the user 12 may wish the system 100 to provide an alert to. These are merely examples, however, and it should be appreciated that the user 12 may provide detailed operating instructions to the system 100 on any desirable number of system 100 functions.

In embodiments, the controller 200 may store operational instructions provided by the user 12. For instance, the user 12 may input and save default operational settings for the system 100. In such embodiments, the when the controller 200 determines that the ignition switch of the vehicle is turned off, the system 100 may only provide an operational prompt 174 to the user 12 asking if the user 12 wishes to operate watch mode. If the user 12 turns on watch mode, the system 100 may implement the default operational settings unless further instructed otherwise by the user 12. The system 100 may also save historical operational settings, such as from the previous three watch mode operations. In such embodiments, the user 12 may page through the last three watch mode operations and select a historic watch mode operation to implement without needing to individually answer each operational prompt 174 on the display 172 in FIG. 3, for instance.

In some embodiments, upon determining that the ignition switch of the vehicle 10 is turned off, the processor 202 may determine that the vehicle 10 is within a common travel pattern. Therefore, the processor 202 may not instruct the system 100 to enter a watch mode, and turn off the system 100. This decision may be based on the assumption that the user 12 is generally familiar with and comfortable with the surroundings of the vehicle 10 when within a common travel pattern, such as near the home or office of the user 12. Upon determining that the ignition switch of the vehicle 10 is off, the processor 202 may determine that the vehicle 10 is outside a common travel pattern and instruct the system 100 to initiate a watch mode. This decision may be based on the assumption that the user 12 is generally unfamiliar with and uncomfortable with the surroundings of the vehicle 10 when outside a common travel pattern. The system 100 may notify the user 12 of its default decision to initiate a watch mode or shut off. The user 12 may override the decision by providing instructions through the user device 170, audio system 132, display system 134, or the like. In such embodiments, the user 12 acquiescing with the default operation to initiate a watch mode, or choosing not to override the default operation, may be considered a user input to initiate a watch mode. In other words, the system 100 may provide a notification to the user 12 that the system 100 is automatically initiating the watch mode. If the user does not provide input to override the default action of the system 100, the system 100 may determine at block 504, that a user input to initiate a watch mode was received, and the method 500 may proceed to block 506.

It should be appreciated that in embodiments, the method 500 may proceed without the block 504. That is, in embodiments, the system may automatically initiate the watch mode after determining that the ignition switch of the vehicle 10 is turned off at block 502. In other words, following the determination that the ignition switch of the vehicle 10 is turned off at block 502, the method 500 may proceed to the block 506.

At block 506 of the method 500, the system 100 determines if the user 12 is within the threshold proximity 14 based on sensor data generated by the one or more sensors 110 and differentiation data generated by the item differentiation module 230, as discussed above. In embodiments, the system 100 may further determine if the user 12 is within the threshold proximity 14 based on data received from the proximity module 150, one or more user devices 170, and/or the one or more key fobs 180, as discussed above. While the determination of whether the user 12 is within the threshold proximity 14 is depicted as a discrete block 506 of the method 500, it should be appreciated that the system 100 is continuously monitoring the position of the user 12. If it is determined at block 506 that the user 12 is not within the threshold proximity 14, the method 500 proceeds to the block 518, where operation of the watch mode is stopped, and the system 100 is turned off, thereby preserving the power supply coupled to the system 100. If it is determined at block 506 that the user 12 is within the threshold proximity 14, the method 500 may proceed to block 508.

At block 508 of the method 500, the system 100 determines if one or more objects 16 are within the second proximity 18 and moving toward the vehicle 10 based on sensor data gathered by the one or more sensors 110 and differentiation data generated by the item differentiation module 230, as discussed with reference to the method 400 depicted in FIG. 4. The method 500 may remain in a loop between blocks 506 and 508. That is, the system 100 may continuously monitor the positions of the user 12 and the one or more objects 16 at blocks 506 and 508 until it is determined that the user 12 is outside the threshold proximity 14. If it is determined at block 508 that one or more objects 16 are within the second proximity 18 and approaching the vehicle 10, the method 500 proceeds to block 510.

At block 510, the system 100 initiates one or more responsive actions. The responsive actions may be initiated by the alarm module 120 and/or the alert module 130, for instance. The system 100 may initiate one or more responsive actions based on the input received from the user 12 at block 504.

In embodiments, the alert module 130 may provide an audial alert to the user 12 through one or more audio systems 132 of the vehicle 10. For instance, the alert module 130 may provide the user 12 with a generic alarm, beeping, or ringtone through the speaker system of the vehicle 10 meant to alert the user 12 of the one or more objects 16 approaching the vehicle 10. In embodiments, the alert module 130 may provide the user 12 with a verbal message through the speaker system of the vehicle 10 meant to alert the user 12 of the one or more objects 16 approaching the vehicle 10. In embodiments, the verbal message may be a generic message, such as "object approaching." In embodiments, the verbal message may provide situation-specific information, such as the specific type of one or more objects 16 approaching the vehicle 10, the distance of the one or more objects 16 from the vehicle 10, and the relative position of the one or more objects 16 with respect to the user 12 or the vehicle 10. For instance, the verbal message may be, "unknown person approaching over left shoulder," or "unknown person approaching from rear of vehicle." In embodiments, the alert module 130 may provide a visual alert to the user 12 through one or more display systems 134 of the vehicle 10. For instance, the alert module 130 may provide a visual alert to the user 12 on the dashboard, head unit, or other display of the vehicle 10. In embodiments, the visual alert may include activating, changing the color of, initiating a blinking function, or the like, of one or more lights in the vehicle 10. In some embodiments, the visual alert may be a generic textual display, such as "object approaching." In embodiments, the visual alert may be a situation-specific textual display, such as "unknown person approaching over left shoulder." In some embodiments, the processor 202 may instruct the alert module 130 to display image data from the one or more sensors 110 of the one or more objects 16 within the second proximity 18 and approaching the vehicle 10 on the one or more display systems 134. In some embodiments, the alert module 130 may simultaneously provide the user 12 with an audial alert on the one or more audio systems 132 and a visual alert on the one or more display systems 134.

In embodiments, the alarm module 120 may activate a vehicle alarm. The vehicle alarm may include one or more audial or visual effects. For instance, the alarm module 120 may repeatedly sound the vehicle horn of the vehicle 10. The alarm module 120 may also flash the headlights and taillights of the vehicle 10. In embodiments, the alarm module 120 may activate any component of the vehicle 10 in an external fashion to draw the attention of the user 12 and other persons in the vicinity of the vehicle 10.

In embodiments, the processor 202 may instruct an audial or visual alert to be provided to the user 12 through the one or more user devices 170. A visual alert may be pushed to a screen of the one or more user devices 170. An audial alert may be pushed to an audio system of the one or more user devices 170. For instance, in embodiments where the one or more user devices 170 is a cellular phone of the user 12, the audial alert may be provided through the speaker or headphone jack of the cellular phone. It should be appreciated that the audial and/or visual alerts provided on the one or more user devices 170 may resemble the audial and visual alerts discussed above with respect to the display system 134 and audio system 132. In embodiments, the system 100 may provide the user 12 with an alert on the one or more user devices 170 instead of, or in conjunction with, an alert through the one or more audio systems 132 and/or the one or more display systems 134. In some embodiments, the system 100, based on instructions received from the user 12 at block 504, may push a notification to one or more external devices 190, as discussed above.

Following the initiation of a responsive action at block 510, the method 500 may proceed to block 512, where it is determined whether the user 12 provides input to cease the one or more responsive actions. For instance, in some embodiments, the user 12 may provide input via the one or more user devices 170, audio system 132, and/or display system 134 to halt an alert or alarm of the system 100 when the user 12 determines that the one or more objects 16 within the second proximity 18 and approaching the vehicle 10 are not of interest. If at block 512, it is determined that the user 12 provides input to cease the one or more responsive actions, the method 500 proceeds to block 514, where the one or more responsive actions are stopped. Furthermore, the system 100 may mark the one or more objects 16 that resulted in the initiation of the responsive action as "safe," such that the system 100 does not repeatedly initiate an alert or alarm while the same one or more objects 16 remain in the second proximity 18. After the responsive action is turned off at block 514, the method 500 may return to block 506. If at block 512, it is determined that the user 12 does not provide input to cease the one or more responsive actions, the one or more responsive actions may continue and the method 500 may proceed to block 516.

In embodiments, at block 516, the system 100 determines if the one or more objects 16 that resulted in the initiation of the responsive action are no longer in the second proximity 18. If it is determined at block 516 that the one or more objects 16 that resulted in initiation of the responsive action are no longer in the second proximity 18, the method 500 may proceed to block 514, where the one or more responsive actions are stopped or turned off. After the one or more responsive actions are stopped or turned off, the method 500 may return to block 506. In such embodiments, the one or more objects 16 that resulted in the initiation of the responsive action may not be marked as "safe." Accordingly, if the same one or more objects 16 return to within the second proximity 18 and begin approaching the vehicle 10, the system 100 may again initiate a responsive action. If it is determined at block 516 that the one or more objects 16 that resulted in the initiation of the responsive action remain within the second proximity 18, the one or more responsive actions may continue and the method 500 may return to block 506.

When the method 500 returns to block 506, the system 100 may continue to monitor the environment surrounding the vehicle 10 to determine if the user 12 is within the threshold proximity 14, and if so, continue to monitor the environment surrounding the vehicle 10 for objects 16 that may be within the second proximity 18 and approaching the vehicle 10 at block 508. The system 100 may initiate multiple responsive actions if it determines that separate objects 16 are within the second proximity 18 and approaching the vehicle 10. For instance, the system 100 may simultaneously provide the user 12 with multiple visual alerts, each visual alert for one of the objects 16 within the second proximity 18 and approaching the vehicle 10.

It should be appreciated, that while at any of blocks 508, 510, 512, 514, and 516 of the method 500, the system 100 continues to monitor the position of the user 12 at block 506. The method 500 continues operation until it is determined at block 506 that the user 12 is no longer within the threshold proximity 14. If at block 506, it is determined that the user 12 is no longer within the threshold proximity 14, the method 500 proceeds to block 518, where the watch mode is stopped and the system 100 is turned off.

In some embodiments, the system 100 may include a kill switch. That is, at any point during the method 500, the user 12 may provide the system 100 with input instructions directing the method 500 to proceed to block 518 where the watch mode is stopped and the system 100 is turned off. For instance, the user 12 may provide an input through the user device 170, the audio system 132, and/or the display system 134 to turn the system 100 off.

Based on the foregoing, it should now be understood that embodiments shown and described herein relate to systems and methods for alerting users of one or more objects approaching a vehicle while the vehicle is off and the user is in close proximity to the vehicle. The systems and methods may continue to operate until it is determined that the user is no longer within a threshold proximity of the vehicle.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A system, comprising:
one or more sensors arranged to detect an area in a proximity of a vehicle;
a controller communicatively coupled to the sensors and configured to:
determine an ignition switch of the vehicle is turned off;
determine a user is within the proximity based on data from the sensors;
determine an object is approaching the vehicle based on the data;
alert the user of the object; and
deactivate the sensors and cease operating in response to determining the user is not within a threshold proximity extending a distance from the vehicle.

2. The system of claim 1, wherein the controller is further configured to provide an audial alert to the user via a speaker system of the vehicle in response to determining the object is approaching the vehicle.

3. The system of claim 1, wherein the controller is further configured to provide a visual alert to the user via a display system of the vehicle in response to determining the object is approaching the vehicle.

4. The system of claim 1, wherein the controller is further configured to push an emergency notification to one or more emergency contacts in response to determining the object is approaching the vehicle.

5. The system of claim 1, wherein the controller is further configured to activate a vehicle alarm in response to determining the object is approaching the vehicle.

6. The system of claim 1, wherein the one or more sensors are vehicle sensors configured to provide data to assist in manual, semi-autonomous, or autonomous operation of the vehicle when the vehicle is turned on.

7. The system of claim 1, wherein the one or more sensors are ultrasonic sensors, radar sensors, cameras, or LiDAR sensors.

8. The system of claim 1, wherein the one or more sensors are positioned on the exterior of the vehicle.

9. The system of claim 1, wherein the controller is further configured to determine the proximity of the user to the vehicle from data received from a key fob.

10. The system of claim 1, wherein the controller is further configured to determine the proximity of the user to the vehicle from data received from a user device.

11. The system of claim 1, wherein the controller is further configured to receive an instruction from a user interface to initiate a watch mode.

12. A vehicle, comprising:
a system, the system comprising:
one or more sensors arranged to detect an area in a proximity of the vehicle;
a controller communicatively coupled to the one or more sensors and configured to:
determine that an ignition switch of the vehicle is turned off;

determine that a user is located within the proximity of the vehicle based on data from the one or more sensors;

determine that an object is approaching the vehicle based on the data;

alert the user that the object is approaching the vehicle; and turn off the system in response to determining the user is not within a threshold proximity to the vehicle, wherein the threshold proximity extends a distance from the vehicle.

13. The vehicle of claim 12, wherein the controller is further configured to receive an instruction from a user interface to initiate a watch mode.

14. The vehicle of claim 12, wherein the one or more sensors are vehicle sensors configured to provide data to assist in manual, semi-autonomous, or autonomous operation of the vehicle when the vehicle is turned on.

15. A method, comprising:
receiving, by a controller in a vehicle, sensor data from one or more sensors communicatively coupled to the controller, that sensor data received when an ignition switch of the vehicle is turned off;

determining that a user is within a proximity of the vehicle from the sensor data;

determining that an object is approaching the vehicle based on the sensor data;

alerting the user that the object is approaching the vehicle; and deactivating the one or more sensors in response to determining the user is not within a threshold proximity to the vehicle, wherein the threshold proximity extends a distance from the vehicle.

16. The method of claim 15, further comprising, prior to receiving the sensor data:
receiving, from a user interface, an instruction to initiate a watch mode.

17. The method of claim 16, further comprising stopping the watch mode in response to determining the user is not within the threshold proximity to the vehicle.

18. The method of claim 15, wherein determining that the user is within the proximity of the vehicle comprises:
receiving external data from at least one of a key fob and a user device; and determining that the user is within the proximity of the vehicle from the external data.

19. The system of claim 1, wherein:
the proximity extends a first distance from the vehicle; and the first distance is greater than the distance the threshold proximity extends from the vehicle.

20. The system of claim 10, wherein the data received from the user device is GPS data.

* * * * *

UNITED STATES PATENT AND TRADEMARK OFFICE
CERTIFICATE OF CORRECTION

| | |
|---|---|
| PATENT NO. | : 11,400,890 B2 |
| APPLICATION NO. | : 17/114867 |
| DATED | : August 2, 2022 |
| INVENTOR(S) | : Apeksha Nayak et al. |

It is certified that error appears in the above-identified patent and that said Letters Patent is hereby corrected as shown below:

On the Title Page

Item (56), U.S. patent documents, cite no. 5, delete "Matsuura" and insert --Matsuura et al.--, therefor.

Page 2, Column 1, item (56), U.S. patent documents, cite no. 7, delete "Remberg Bueno" and insert --Remberg Bueno et al.--, therefor.

In the Specification

In Column 2, Line(s) 12, delete "embodiment" and insert --embodiments--, therefor.

Signed and Sealed this
Fifteenth Day of November, 2022

Katherine Kelly Vidal
*Director of the United States Patent and Trademark Office*